US011216656B1

(12) United States Patent
Zia et al.

(10) Patent No.: US 11,216,656 B1
(45) Date of Patent: Jan. 4, 2022

(54) SYSTEM AND METHOD FOR MANAGEMENT AND EVALUATION OF ONE OR MORE HUMAN ACTIVITIES

(71) Applicant: Retrocausal, Inc., Sammamish, WA (US)

(72) Inventors: Muhammad Zeeshan Zia, Sammamish, WA (US); Quoc-Huy Tran, Redmond, WA (US); Andrey Konin, Redmond, WA (US)

(73) Assignee: Retrocausal, Inc.

( * ) Notice: Subject to any disclaimer, the term of this patent is extended or adjusted under 35 U.S.C. 154(b) by 0 days.

(21) Appl. No.: 17/352,409

(22) Filed: Jun. 21, 2021

Related U.S. Application Data

(60) Provisional application No. 63/125,998, filed on Dec. 16, 2020.

(51) Int. Cl.
*G06K 9/00* (2006.01)
*G06K 9/62* (2006.01)
(Continued)

(52) U.S. Cl.
CPC ..... *G06K 9/00335* (2013.01); *G06K 9/00718* (2013.01); *G06K 9/6256* (2013.01);
(Continued)

(58) Field of Classification Search
CPC ............. G06K 9/00335; G06K 9/6256; G06K 9/00718; G06N 3/04; G06T 7/0002;
(Continued)

(56) References Cited

U.S. PATENT DOCUMENTS

| 11,017,690 B1 | 5/2021 | Zia et al. |
| 2020/0012940 A1* | 1/2020 | Liu ........................ G06T 3/4007 |

(Continued)

OTHER PUBLICATIONS

Xu et al., "Exploring Techniques for Vision Based Human Activity Recognition: Methods, Systems, and Evaluation", Jan. 25, 2013, Open Access Sensors ISSN 1424-8220, pp. 1635-1650 (Year: 2013).*

(Continued)

*Primary Examiner* — Ping Y Hsieh
(74) *Attorney, Agent, or Firm* — Jason C. Cameron

(57) ABSTRACT

A system and method for management and evaluation of one or more human activities is disclosed. The method includes receiving live videos from data sources. The live videos comprises activity performed by human. The activity comprises actions performed by the human. Further, the method includes detecting the actions performed by the human in the live videos using a neural network model. The method further includes generating a procedural instruction set for the activity performed by the human. Also, the method includes validating quality of the identified actions performed by the human using the generated procedural instruction set. Furthermore, the method includes detecting anomalies in the actions performed by the human based on results of validation. Additionally, the method includes generating rectifiable solutions for the detected anomalies. Moreover, the method includes outputting the rectifiable solutions on a user interface of a user device.

20 Claims, 11 Drawing Sheets

(51) Int. Cl.
   *G06T 7/00* (2017.01)
   *G06N 3/04* (2006.01)
(52) U.S. Cl.
   CPC .............. *G06N 3/04* (2013.01); *G06T 7/0002* (2013.01); *G06T 2207/10016* (2013.01); *G06T 2207/20081* (2013.01); *G06T 2207/20084* (2013.01); *G06T 2207/30196* (2013.01)
(58) Field of Classification Search
   CPC . G06T 2207/30196; G06T 2207/20081; G06T 2207/20084; G06T 2207/10016
   See application file for complete search history.

(56) References Cited

U.S. PATENT DOCUMENTS

| | | | |
|---|---|---|---|
| 2021/0073525 A1* | 3/2021 | Weinzaepfel | ........ G06K 9/6269 |
| 2021/0321035 A1* | 10/2021 | Sherrah | ..................... G06T 7/74 |

OTHER PUBLICATIONS

Recognition and Tracking of 3D Objects; Christian Wiedemann, Markus Ulrich, and Carsten Steger; MVTec Software GmbH, Neherstr. 1, 81675 Munchen, Germany; {Wiedemann, ulrich, steger}@mvtec.com.

A Probabilistic Programming Language for Scene Perception; Tejas D Kulkarni, Pushmeet Kohli, Joshua B Tenenbaum, Vikash Mansinghka; http://sunw.csail.mit.edu/2015/papers/75_Kulkarni_SUNw.pdf.

A Dataset for Understanding Complex Web Videos via Question Answering; Zhou Yu, Dejing Xu, Jun Yu, Ting Yu, Zhou Zhao, Yueting Zhuang, Dacheng Tao; arXiv:1906.02467v1 [cs.CV] Jun. 6, 2019.

Learning Spatiotemporal Features with 3D Convolutional Networks; Du Tran, Lubomir Bourdev, Rob Fergus, Lorenzo Torresani, Manohar Paluri, Facebook AI Research, Dartmouth College; arXiv:1412.0767v4 [cs.CV] Oct. 7, 2015.

* cited by examiner

SYSTEM AND METHOD FOR MANAGEMENT AND EVALUATION OF ONE OR MORE HUMAN ACTIVITIES

CROSS-REFERENCE TO RELATED APPLICATIONS

This application is a complete specification of provisional patent application No. 63/125,998 titled "SYSTEM AND METHOD FOR MANAGEMENT AND EVALUATION OF ONE OR MORE HUMAN ACTIVITIES" filed on Dec. 16, 2020 with the United States Patent and Trademark Office.

FIELD OF INVENTION

Embodiments of the present disclosure relate to video processing systems and more particularly to a system and a method for management and evaluation of one or more human activities.

BACKGROUND

Human activity recognition in videos is an essential task in processing systems as to it records people's behaviours with data that allows the processing systems to monitor, analyse, evaluate and assist their daily life. Traditionally, in order to understand a certain complex human activity with multiple conditional steps, one still needs a team of PhD-level computer vision or embedded systems engineers for writing a customized code representing that specific human activity. This specific human activity may be, for example, changes in human pose with respect to nearby object movements over time. This customized code helps build a temporal causation structure on top of visual recognition capabilities, usually provided by existing platforms. Although these platforms provide capabilities to estimate the human poses, locate objects, and even classify or segment simple actions in video (such as "take" or "twist"), the platforms rely heavily on human experts to evaluate these poses, or objects or actions in the video. For example, an average medical procedure needs six person-months to construct such a customized model, in addition to requiring hundreds of recorded video demonstrations to train machine learning models.

In some conventional approaches, a bank of mathematical functions are computed to obtain "features" on small video clips, which act as a "signature" of sub-action depicted in a video clip. These approaches in turn train the machine learning models to classify a small video clip as belonging to a certain "action" class. Unfortunately, merely classifying a group of video frames as belonging to a step in the human activity does not indicate whether the objective of the step was met or not. It also does not scale to variations of the human activity not seen in training dataset, for example, alternative product configurations, or semi-repetitive maintenance scenarios as opposed to strictly repetitive assembly tasks.

In yet another conventional approach, combining language with visual recognition is used for visual question answering of the video clips. Unfortunately, these approaches are hard to incorporate prior knowledge about quality checks in order to evaluate the human activity performed in the video clips. Actions and objects on a factory floor are significantly more diverse than internet videos, and hence these approaches rely on very large datasets and sometimes overfit to the language used. Therefore, these approaches are not immediately relevant to industrial processes.

In still another conventional approach, scoring quality of a human activity using machine learning models are used. These approaches typically train the machine learning models to directly predict (i.e., "regress") a score of the human activity such as an Olympic event. These approaches reason about activities at a coarse-grained level and cannot finely analyse whether individual steps were performed correctly.

Hence, there is a need for an improved system and a method for management and evaluation of one or more human activities in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system for management and evaluation of one or more human activities is disclosed. The system includes one or more hardware processors and a memory coupled to the one or more hardware processors. The memory includes plurality of subsystems in the form of programmable instructions executable by the one or more hardware processors. The plurality of subsystems includes a receiver subsystem configured for receiving one or more live videos from one or more data sources. The one or more live videos comprises at least one activity performed by a human. The at least one activity comprises one or more actions performed by the human. The plurality of subsystem further includes an action classifier subsystem configured for detecting the one or more actions performed by the human in the received one or more live videos using a neural network model. Furthermore, the plurality of subsystem includes an activity instruction generator subsystem configured for generating a procedural instruction set for the at least one activity performed by the human upon detecting the one or more actions performed by the human. Further, the plurality of subsystem includes an action quality validation subsystem configured for validating quality of the identified one or more actions performed by the human using the generated procedural instruction set. Also, the plurality of subsystem includes an anomaly detection subsystem configured for detecting one or more anomalies in the one or more actions performed by the human based on results of validation. Additionally, the plurality of subsystems includes a rectifiable solution generator subsystem configured for generating one or more rectifiable solutions for the detected one or more anomalies. Moreover, the plurality of subsystems includes an output subsystem configured for outputting the generated one or more rectifiable solutions on a user interface of a user device.

In accordance with another embodiment of the present disclosure, a method for management and evaluation of one or more human activities is disclosed. The method includes receiving one or more live videos from one or more data sources. The one or more live videos comprises at least one activity performed by a human. The at least one activity comprises one or more actions performed by the human. Further, the method includes detecting the one or more actions performed by the human in the received one or more live videos using a neural network model. The method further includes generating a procedural instruction set for the at least one activity performed by the human upon detecting the one or more actions performed by the human. Also, the method includes validating quality of the identified one or more actions performed by the human using the generated procedural instruction set. Furthermore, the method includes detecting one or more anomalies in the one or more actions performed by the human based on results of validation. Additionally, the method includes generating one or more rectifiable solutions for the detected one or more anomalies. Moreover, the method includes outputting the generated one or more rectifiable solutions on a user interface of a user device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
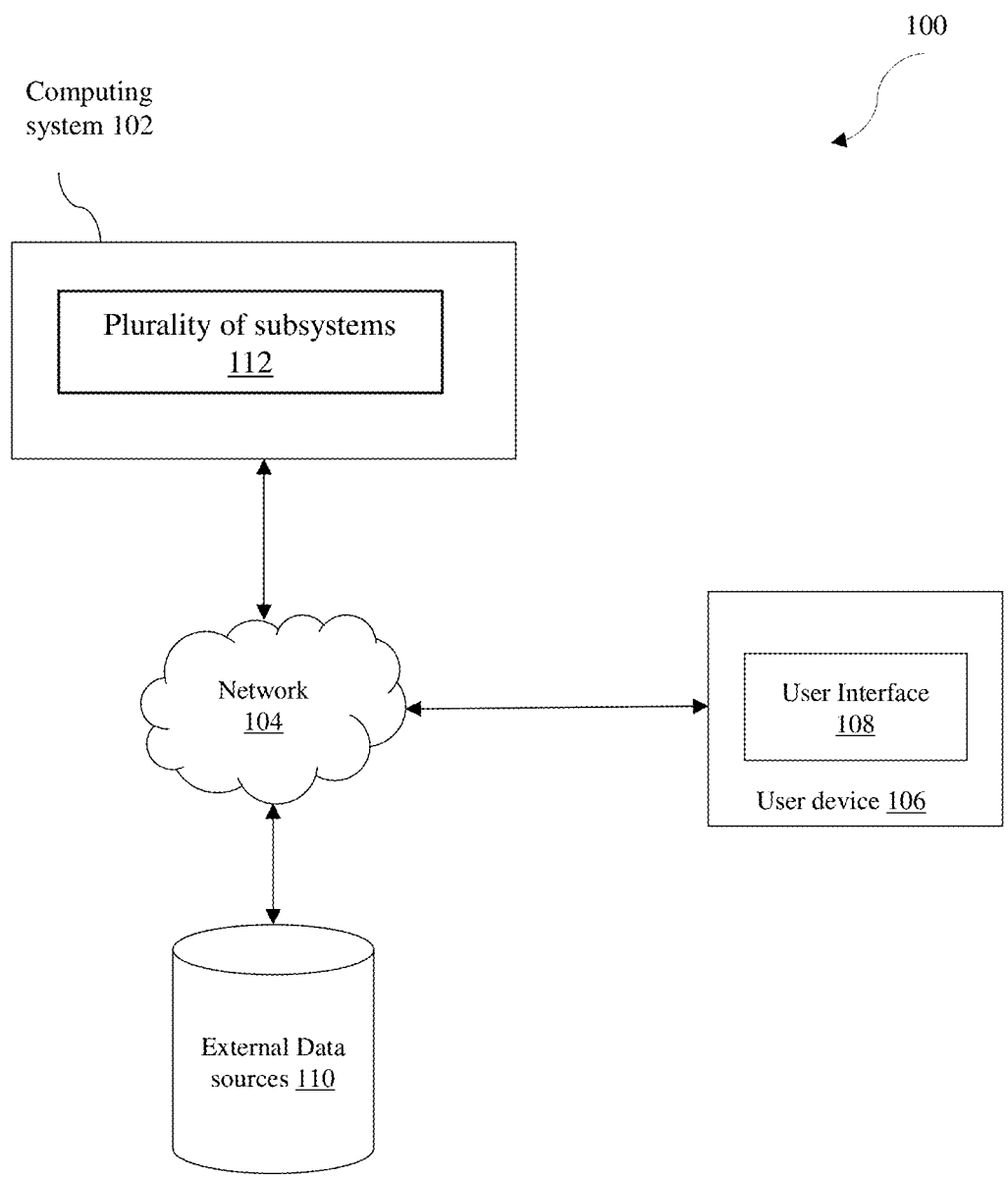
FIG. 1 is a block diagram illustrating an exemplary computing environment for management and evaluation of one or more human activities, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module may comprise dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Throughout this document, the terms browser and browser application may be used interchangeably to mean the same thing. In some aspects, the terms web application and web app may be used interchangeably to refer to an application, including metadata, that is installed in a browser application. In some aspects, the terms web application and web app may be used interchangeably to refer to a website and/or application to which access is provided over a network (e.g., the Internet) under a specific profile (e.g., a website that provides email service to a user under a specific profile). The terms extension application, web extension, web extension application, extension app and extension may be used interchangeably to refer to a bundle of files that are installed in the browser application to add functionality to the browser application. In some aspects, the term application, when used by itself without modifiers, may be used to refer to, but is not limited to, a web application and/or an extension application that is installed or is to be installed in the browser application.

Embodiments of the present disclosure disclose a system and method for managing and evaluating one or more human activities. The present system provides a novel visual programming language by combining a set of query elements to describe quality checking, training feedback, and analytics use cases and evaluating the one or more human activities. A querying interface is built on top of action localization in videos. The present system trains a machine learning model for action classification (such as a Convolutional Neural Network for video classification) to detect individual action steps in real-time. The user is provided with the set of "query elements" which are utilized to set up questions that are to be asked of the video during live performance of the activity. A trigger element transfers control flow from the action classification network, when the beginning of the relevant sub-action is detected, to a block of interconnected query elements. The present system allows building compositional video understanding pipelines, which work across product configurations and beyond the activity variations depicted in training examples. End users can build such complex quality control and guidance experiences within hours instead of months with the present system. The present system analyzes a long list of diverse manufacturing assembly processes and break them down into a small set of atomic sub-actions. Later, the query elements corresponding to these atomic sub actions are defined. These query elements allow an industrial engineer to validate their correct performance in live video. The query elements are wrapped in a visual "no-code" interface that allows setting up complex quality checking programs by combining together several of these query elements.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for management and evaluation of one or more human activities, in accordance with an embodiment of the present disclosure, in accordance with an embodiment of the present disclosure. According to FIG. 1, the computing environment 100 comprises a computing system 102 which is capable of managing and evaluating one or more human activities. The one or more human activities are performed in one or more videos and are stored in external data sources 110. The computing system 102 is connected to the external data sources 110 via a network 104 (e.g., Internet). The computing system 102 is further connected to a user device 106 via the network 104 (e.g., Internet). In one specific embodiment, the one or more communication networks 104 may include, but not limited to, an internet connection, a wireless fidelity (WI-FI) and the like. Although, FIG. 1 illustrates the computing system 102 connected to one user device 106, one skilled in the art can envision that the computing system 102 can be connected to several user devices located at different locations via the network 104.

The user devices 106 can be a laptop computer, a desktop computer, a tablet computer, a smartphone and the like. The user device 106 can access software applications via a web browser. The user device 106 includes a user interface 108 for managing the software applications for managing and evaluating the one or more human activities. The software application may be a web application including one or more web pages or a native application installed on the user device 106.

The computing system 102 includes an interface, a server including hardware assets and an operating system (OS), a network interface, and application program interfaces (APIs). The interface enables communication between the server and the user device 106. As used herein, "computing environment" 100 refers to a processing environment comprising configurable computing physical and logical assets, for example, networks, servers, storage, applications, services, etc., and data distributed over the platform. The computing environment 100 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and application programming interfaces (APIs), and other peripherals required for providing cloud computing functionality. A detailed view of the computing system 102 is provided in FIG. 2.

The computing system 102 comprises a plurality of subsystems 112 configured for managing and evaluating the one or more human activities. In an embodiment, the computing system 102 is configured for receiving one or more live videos from one or more data sources. The one or more live videos comprises at least one activity performed by a human. The at least one activity comprises one or more actions performed by the human. The computing system 102 is further configured for detecting the one or more actions performed by the human in the received one or more live videos using a neural network model. Further, the computing system 102 is configured for generating a procedural instruction set for the at least one activity performed by the human upon detecting the one or more actions performed by the human. Also, the computing system 102 is configured for validating quality of the identified one or more actions performed by the human using the generated procedural instruction set. Furthermore, the computing system 102 is configured for detecting one or more anomalies in the one or more actions performed by the human based on results of validation. Additionally, the computing system 102 is configured for generating one or more rectifiable solutions for the detected one or more anomalies. Moreover, the computing system 102 is configured for outputting the generated one or more rectifiable solutions on a user interface of the user device 106.

The external data sources 110 are external databases comprising the live videos. For example, the external data sources 110 is configured to store the live videos. In an exemplary embodiment, a user of the user device 106 captures live video of a scene. The scene may include a human and an object. The human may interact with the object to perform a human activity. Therefore, the live videos may include one or more human activities. The captured live videos may then be stored on the local storage device of the user device 106 as well as uploaded to the external data sources 110. The external data sources 110 holds a record of such live videos. Each of the captured live videos comprises one or more video frames. The live video is then accessed by the computing system 102 via the network 104 for processing the live videos.

In one alternate embodiment, the user device 106 may itself act as a computing system 102 capable of managing and evaluating the one or more human activities as described herein. In such embodiment, the user device 106 itself comprises the plurality of subsystems 112.

Further, in such embodiment, the user device 106 interacts with the one or more external data sources 110 to access the live videos.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a computing system 102 as is unique to the present disclosure or necessary for an understanding of the present disclosure is depicted and described. The remainder of the construction and operation of the computing system 102 may conform to any of the various current implementation and practices known in the art.

Figure 2:
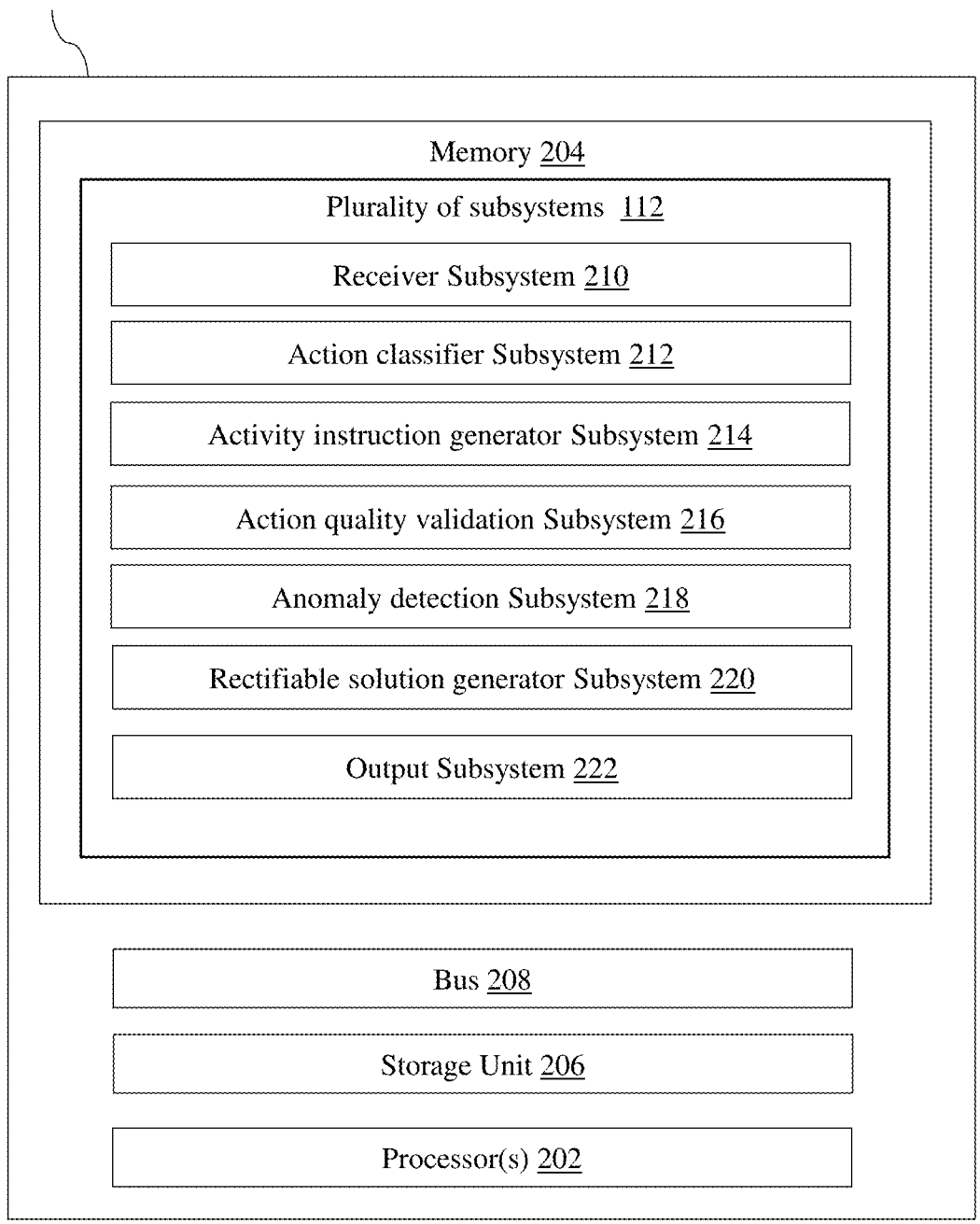
FIG. 2 is a block diagram illustrating an exemplary computing system, such as those shown in FIG. 1, capable of managing and evaluating one or more human activities, in accordance with an embodiment of the present disclosure.

FIG. 2 is a block diagram illustrating an exemplary computing system 102, such as those shown in FIG. 1, capable of managing and evaluating one or more human activities, in accordance with an embodiment of the present disclosure. In FIG. 2, the computing system 102 comprises a processor 202, a memory 204, and a storage unit 206. The processor 202, the memory 204 and the storage unit 206 are communicatively coupled through a system bus 208 or any similar mechanism. The memory 204 comprises a plurality of subsystems 112 (such as those shown in FIG. 1) in the form of programmable instructions executable by the one or more processors 202. The plurality of subsystems 112 further includes a receiver subsystem 210, an action classifier subsystem 212, an activity instruction generator subsystem 214, an action quality validation subsystem 216, an anomaly detection subsystem 218, a rectifiable solution generator subsystem 220 and an output subsystem 222.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like. The computing system 102 may be a cloud computing system or a remote server.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes a plurality of subsystems 112 stored in the form of machine-readable instructions on any of the above-mentioned storage media and may be in communication with and executed by the processor(s) 202.

The receiver subsystem 210 is configured for receiving one or more live videos from one or more data sources 110. The one or more live videos comprises at least one activity performed by a human. The at least one activity comprises one or more actions performed by the human. Each of the one or more live videos comprises a complete scene or a part of the scene captured. In one embodiment, the at least one activity may include an assembly job on a manufacturing floor, a maintenance task on a complex piece of equipment, a medical procedure and the like.

The action classifier subsystem 212 is for detecting the one or more actions performed by the human in the received one or more live videos using a neural network model. The neural network model may be for example, a convolution neural network. The one or more actions performed by the human may include, for example, picking up a fan, moving a fan, attaching an object to another object and the like. In detecting the one or more actions performed by the human in the received one or more live videos using the neural network model, the action classifier subsystem 212 is configured for classifying the one or more live videos into one or more subset video data based on type of activity performed by the human in the received one or more live videos. For example, if the type of activity performed by the human is an assembly activity or a medical procedure, or a maintenance task, then the one or more live videos are classified into one or more subset video data based on such type of activity. In this case, the subset video data comprises video clips or frames where human is performing one type of activity. Further, the action classifier subsystem 212 is configured for identifying the one or more actions performed by the human in the one or more subset video data. The one or more subset video data comprises a human performing a part of the activity. For example, in order to perform an assembly job, the worker needs to first pick up first component to be assembled, place it within the main component, tighten a screw and so on. Hence, for each activity, there are many actions involved to complete the activity. Therefore, each subset video data includes a part of the action of that activity performed. Therefore, each subset video data comprises either one full action or a part of one action. Further, the action classifier subsystem 212 is configured for assigning labels to the one or more subset video data based on the identified one or more actions performed by the human. Also, the action classifier subsystem 212 is configured for transferring the assigned labels from the labelled one or more subset video data to super set of training videos by determining nearest neighbor for each of at least one individual video frames and the labelled one or more subset video data. Furthermore, the action classifier subsystem 212 is configured for performing frame-level ordering constraints to the super set of training videos. Also, the action classifier subsystem 212 is configured for generating an increased number of training videos from the super set of training videos by augmenting the super set of training videos. This step generates a significantly larger training set by augmenting given videos in several ways. For example, a deep fake video generation may be used to transfer person appearance (which have previously only been used in contexts where a fake video generated itself was to be consumed by humans generally for entertainment), perform background reconstruction to augment background appearance, add or delete sub-steps in a controlled manner in the provided videos and the like. This provides us with enough variations to train a video clip classification model and generalize to unseen cases. This part of the system 102 enables us to estimate the duration of individual steps or actions in the human activity. However, merely classifying a group of frames as belonging to a step in the activity, does not tell us whether the objective of the step was met or not. It also does not scale to variations of the activity not seen in the training set for example, alternative product configurations, or semi-repetitive maintenance scenarios as opposed to strictly repetitive assembly tasks.

Additionally, the action classifier subsystem 212 is configured for training the neural network model with the generated increased number of training videos. In some realizations, intermediate representations are shared between different modules, the action classification CNN as well as other query elements processing the same parts (temporal or spatial) of the data to speed computation.

Moreover, the action classifier subsystem 212 is configured for detecting the one or more actions performed by the human in the received one or more live videos using the trained neural network model. The neural network may either classify a single frame of video, or several frames of video into a specified set of action classes such as 'tighten screw', ' pick screwdriver', etc., as well as a ' background' class which implies that no relevant action is performed in this part of the video. This classification is performed over the entire video in a "sliding window" fashion, to find where an action or step of interest in performed i.e., frames that are not just labeled 'background' class by the classifier. The neural network model itself may be organized in several ways, such as it may be a recurrent neural network e.g., an LSTM (Long Short-Term Memory) or a GRU (Gated Recurrent Units), which is fed individual frames or clips of the video sequentially. Alternatively, the neural network model may process several consecutive frames simultaneously, when the video frames are stacked together in a 3D volume, in which case the model may be some form of 3D convolutional network from literature. Alternatively, the neural network may first compute features for individual frames, combine these features together, and feed these features into subsequent neural network layers. Alternatively, the action classifier may detect human hand location or the location of full human skeleton and use boundaries in the image to classify actions such as hands placed on a certain region of an object that is being assembled on a factory floor.

The activity instruction generator subsystem 214 is configured for generating a procedural instruction set for the at least one activity performed by the human upon detecting the one or more actions performed by the human. In generating the procedural instruction set for the at least one activity performed by the human, the activity instruction generator subsystem 214 is configured for defining one or more operations for each of the detected one or more actions performed by the human. The one or more operations may include touch, move, count, attach, layout and the like. Further, the activity instruction generator subsystem 214 is configured for defining one or more sub-actions to be performed by the human for each of the defined one or more operations. The one or more sub-actions which performs the defined one or more operations yields desired end result. For example, the one or more sub-actions may be picking up a fan, switching on a light, moving from one place to other and the like. These sub-actions together form one action and many such actions form a human activity. Therefore, performing all sub-actions completes the activity. Here, the completion of the activity is the desired end result. Also, the activity instruction generator subsystem 214 is configured for generating the procedural instruction set for the at least one activity performed by the human. The generated procedural instruction set comprises the one or more operations, the one or more sub-actions and one or more query lists associated with the one or more operations and the one or more sub-actions. In one specific embodiment, the one or more query lists may include one or more questions related to the selected activity or action, for example, were the screws used by the user the right type, did the user check the one or more sensors used and the like. In one embodiment, an activity SQL program may visually represent the one or more query lists defined on one or more training videos. In an exemplary embodiment, a long list of diverse manufacturing assembly processes (which is an activity as a whole) are studied and the activity are broken down into a small set of atomic sub-actions. The query elements are defined in Table. 1 below which correspond to these atomic sub actions. These query elements allow an industrial engineer to validate the correct performance of the sub-actions in live video. These query elements are wrapped in a visual "no-code" interface that allows setting up complex quality checking programs by combining together several of these query elements. Below table. 1 depicts exemplary query elements which can be combined to "check" a diverse set of manual processes or human activities:

TABLE 1

| Query element or Operations | Purpose/"Question" |
| --- | --- |
| Touch | Did a specified tool or hand touch specific points on a three-dimensional (3D) object? |
| Attach | Were specific parts placed on specific regions of an object |
| Move | Did the person move an object in 3D? |
| Count | Count the number of times a certain (sub-)action is performed. |
| Match | Match an object against a template image. |
| Permute | Specify which steps in the activity can be performed out-of-order. |
| Interact | Model different human-human interaction events by confirming that two workers are holding two sides on an object simultaneously. |
| Handed | Specify invariance to left v. right handedness, and other human body related artefacts. |
| Layout | Manually specify a 3D coarse layout for the scene, which the analytics engine will populate and compare against a dataset of alternatives for continuous improvement. E.g., alternative tabletop layouts to improve process efficiency. (See FIG. 5). |

The action quality validation subsystem 216 is configured for validating quality of the identified one or more actions performed by the human using the generated procedural instruction set. The quality of the identified one or more actions performed determines the correctness or accuracy of the action performed. For example, quality is a validation check performed to assess performance of the action. The query lists within the generation procedural set helps in validating the quality of the actions. For example, the query lists such as, Did the worker perform the correct steps with acceptable deviations that were not captured in the training set, such as right-handedness versus left-handedness? Did worker one hand over part X to worker two during step J? Did the worker put four separate screws at every joint of a balcony assembly? Were the screws used the right type? Did the worker put her hands against every proximity sensor one-by-one on the product to test them all? If answers to these questions are true, then the validation is successful. If answer to any one of the question is false, then the validation is unsuccessful. In validating the quality of the identified one or more actions performed by the human using the generated procedural instruction set, the action quality validation subsystem 216 is configured for detecting starting action of the at least one activity to be performed by the human from the received one or more live videos. For example, the starting action of an assembly job may be a worker opening assembly room door. The action quality validation subsystem 216 is configured for detecting one or more objects interacting with the human in the received one or more live videos. A user environment where the user performs the human activity may comprise many objects, other humans, other devices and so on. Hence, it is important to determine only those objects necessary for the human to complete the activity. Furthermore, the action quality validation subsystem 216 is configured for tracking interaction of the detected one or more objects with the human by determining object trajectory of the one or more objects in a spatial dimension with respect to the one or more actions performed by the human. For example, object trajectory of the object may be path traversed by the object, including a start position to an end position in order to complete a sub-action or an action. For example, lifting of an object from the floor onto a table. In this case, the object's path travelled from floor to table is the object trajectory. The interaction of the one or more objects with human may include how the human performs the task with the object. For example, raising the hand with the object, touching the object and the like. The spatial dimension of the objects provide spatial position coordinates, such as X, Y and Z axes of the object. Also, the action quality validation subsystem 216 is configured for classifying the tracked interaction of the detected one or more objects with the human into one or more operations and one or more sub-actions. Additionally, the action quality validation subsystem 216 is configured for performing a first level of validation by comparing the classified one or more operations and one or more sub-actions with the one or more operations and the one or more sub-actions comprised in the generated procedural instruction set. For example, did the doctor pick up syringe, where picking up is an action, syringe is an object which are defined and stored in the procedural instruction set. Also, the action quality validation subsystem 216 is configured for performing a second level of validation by determining whether the classified one or more operations and the one or more sub-actions meet requirements of predefined quality checks. For example, did the doctor pick up right syringe, where the size and specifications of the syringe are predefined quality checks. Additionally, the action quality validation subsystem 216 is configured for validating the quality of the identified one or more actions performed by the human based on the results of first level of validation and the second level of validation. If the doctor has puck up the syringe and if the doctor has pick up the right syringe, then both level of validation is successful and the quality of the actions performed is validated to be successful. In contrast, if the doctor has not picked up the syringe but some other object and if the doctor has picked up other object of different specification, then both level of validation fails and the quality of the actions performed is validated to be unsuccessful. In an embodiment, the action quality validation subsystem 216 may provide a score on a completion of each of the one or more sub-actions associated with the selected activity.

The anomaly detection subsystem 218 is configured for detecting one or more anomalies in the one or more actions performed by the human based on results of validation. The anomalies may be absence of authorized worker and presence of some other unauthorized worker, performing an action wrongly, using some other object for the activity, using an object of some other configuration and the like. In detecting the one or more anomalies in the one or more actions performed by the human based on results of validation, the anomaly detection subsystem 218 is configured for determining a deviation in the one or more actions performed by the human with respect to the one or more actions defined in the procedural instruction set based on results of a first level of validation. The deviation may be change or absence of an object with defined configuration or the like. Further, the anomaly detection subsystem 218 is configured for determining whether classified one or more operations and the one or more sub-actions fail to meet requirements of the predefined quality checks based on results of a second level of validation. Furthermore, the anomaly detection subsystem 218 is configured for detecting the one or more anomalies in the one or more actions performed by the human based on the deviation and if the one or more operations and the one or more sub-actions fail to meet requirements of the predefined quality checks.

The rectifiable solution generator subsystem 220 is configured for generating one or more rectifiable solutions for the detected one or more anomalies. In generating the one or more rectifiable solutions for the detected one or more anomalies, the rectifiable solution generator subsystem 220 is configured for mapping the detected one or more anomalies with corresponding prestored anomalies stored in an action improvement database. Further, the rectifiable solution generator subsystem 220 is configured for determining one or more rectifiable solutions corresponding to the mapped prestored anomalies. The one or more rectifiable solutions may include a new workspace layout suggestion, a correct human posture, one or more assembly errors and the like. Also, the rectifiable solution generator subsystem 220 is configured for retrieving the one or more rectifiable solutions for the detected one or more anomalies from the action improvement database. The rectifiable solution generator subsystem 220 is configured for optimizing the retrieved one or more rectifiable solutions for the detected one or more anomalies based on a user requirement. Furthermore, the rectifiable solution generator subsystem 220 is configured for generating the optimized one or more rectifiable solutions for the detected one or more anomalies.

The output subsystem 222 is configured for outputting the generated one or more rectifiable solutions on the user interface 108 of the user device 106. Further, the output subsystem 222 is configured for generating one or more query lists associated with each of the one or more operations and the one or more sub-actions performed by the human in the received one or more live videos. The one or more query lists may include questions associated with the actions as shown in Table. 1. Further, the output subsystem 222 is configured for outputting the generated one or more query list on the user interface 108 of the user device 106 using augmented, virtual or mixed reality while performing the at least one activity by the human in real time. Furthermore, the output subsystem 222 is further configured for generating one or more alert messages upon detecting the one or more anomalies. Furthermore, the output subsystem 222 is configured for reporting the generated one or more alert messages to the user device 106 using a communication network 104.

The plurality of subsystems 112 further comprises a simulator subsystem configured for simulating the generated one or more rectifiable solutions for the detected one or more anomalies in a simulation environment. The simulation environment may be a virtual environment emulating the physical user environment with the same physical setup comprising a human and desired objects required for completing an activity. Furthermore, the simulator subsystem is configured for updating the generated one or more rectifiable solutions with one or more alternative solutions based on results of simulation.

The storage unit 206 stores information relating to the live videos and other related information. The storage unit 206 is, for example, a structured query language (SQL) data store. The storage unit 206 is configured as cloud-based database implemented in the computing environment 100, where software application are delivered as a service over a cloud platform. The storage unit 206, according to another embodiment of the present disclosure, is a location on a file system directly accessible by the plurality of subsystems 112. The storage unit 206 is configured to store the live videos, the one or more human activities, neural network models, and the like.

Figure 3:
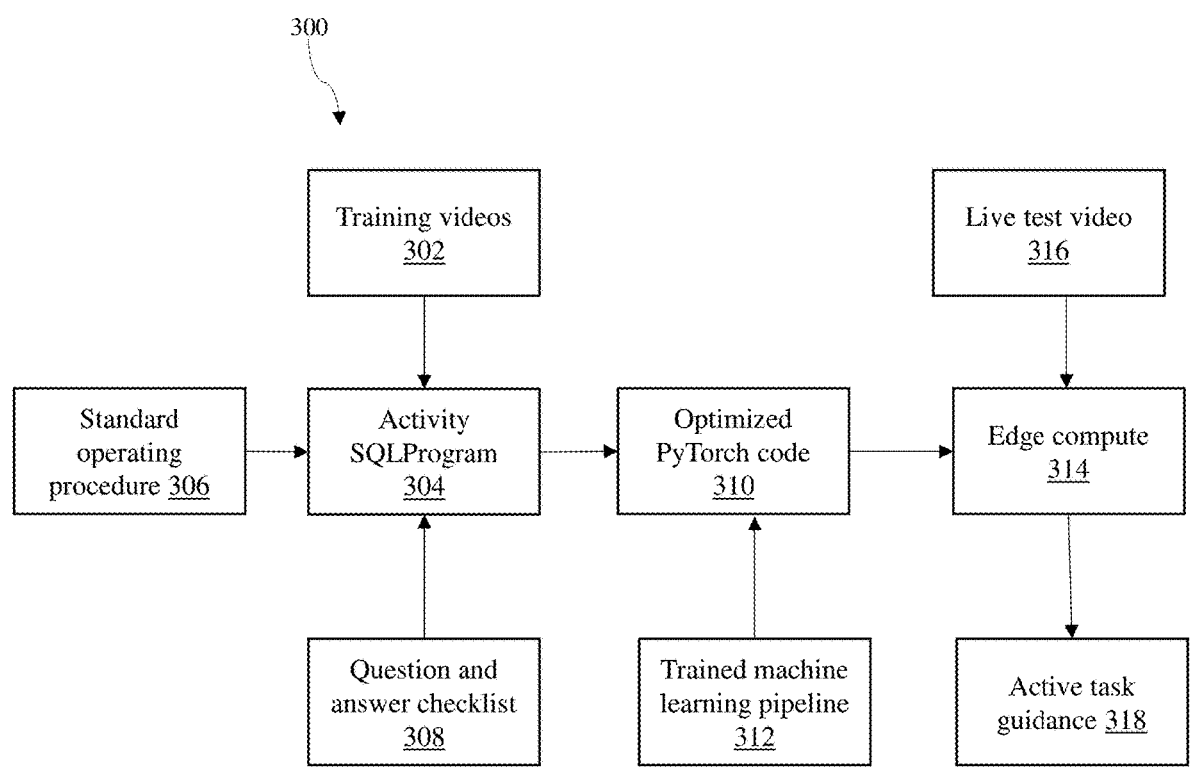
FIG. 3 is a block diagram illustrating an exemplary process of managing and evaluating one or more human activities, in accordance with an embodiment of the present disclosure.

FIG. 3 is a block diagram illustrating an exemplary process 300 of managing and evaluating one or more human activities, in accordance with an embodiment of the present disclosure. According to FIG. 3, one or more training videos 302 are inputted to an activity SQL Program 304. The activity SQL program 304 also receives input from standard operating procedure 306. The activity SQL program 304 analyses the training videos 302 and validates the one or more human activities performed in the training videos 302 using the standard operating procedure 306 and a question-and-answer checklist 308. The activity SQLprogram 304 visually represents the question-and-answer checklist 308 defined on the training videos 302 and then constructs plurality of trained machine learning pipelines 312 to perform the question-and-answer checklist 308 on relevant video segments. The activity SQL program generates neurosymbolic code, such as an optimized pytorch code 310 to validate correct performance of a human activity in the training videos 302 and potentially search for improvements to the original process itself. Later, the results of the validation are fed to edge compute system 314. The edge compute system 314 processes live test video 316 using the results of validation and outputs an active task guidance 318. The active task guidance 318 may comprise one or more rectifiable solutions for performing the one or more human activities accurately. As used herein, the term 'edge compute' refers to a distributed computing paradigm that brings computation and data storage closer to the location where it is needed, to improve response times and save bandwidth.

Figure 4:
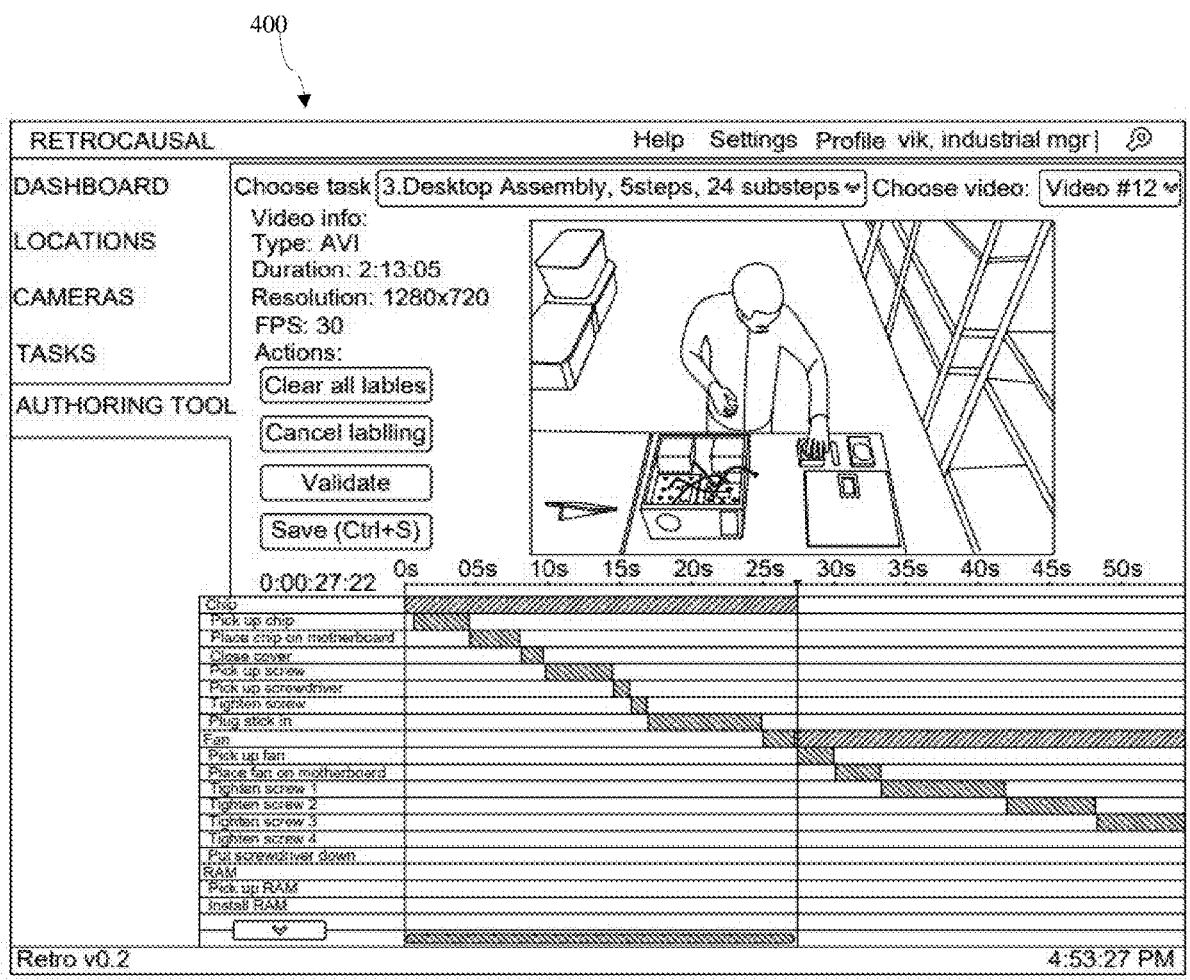
FIG. 4-FIG. 6 are exemplary graphical user interface representations capable of managing and evaluating one or more human activities, in accordance with an embodiment of the present disclosure.
Figure 5:
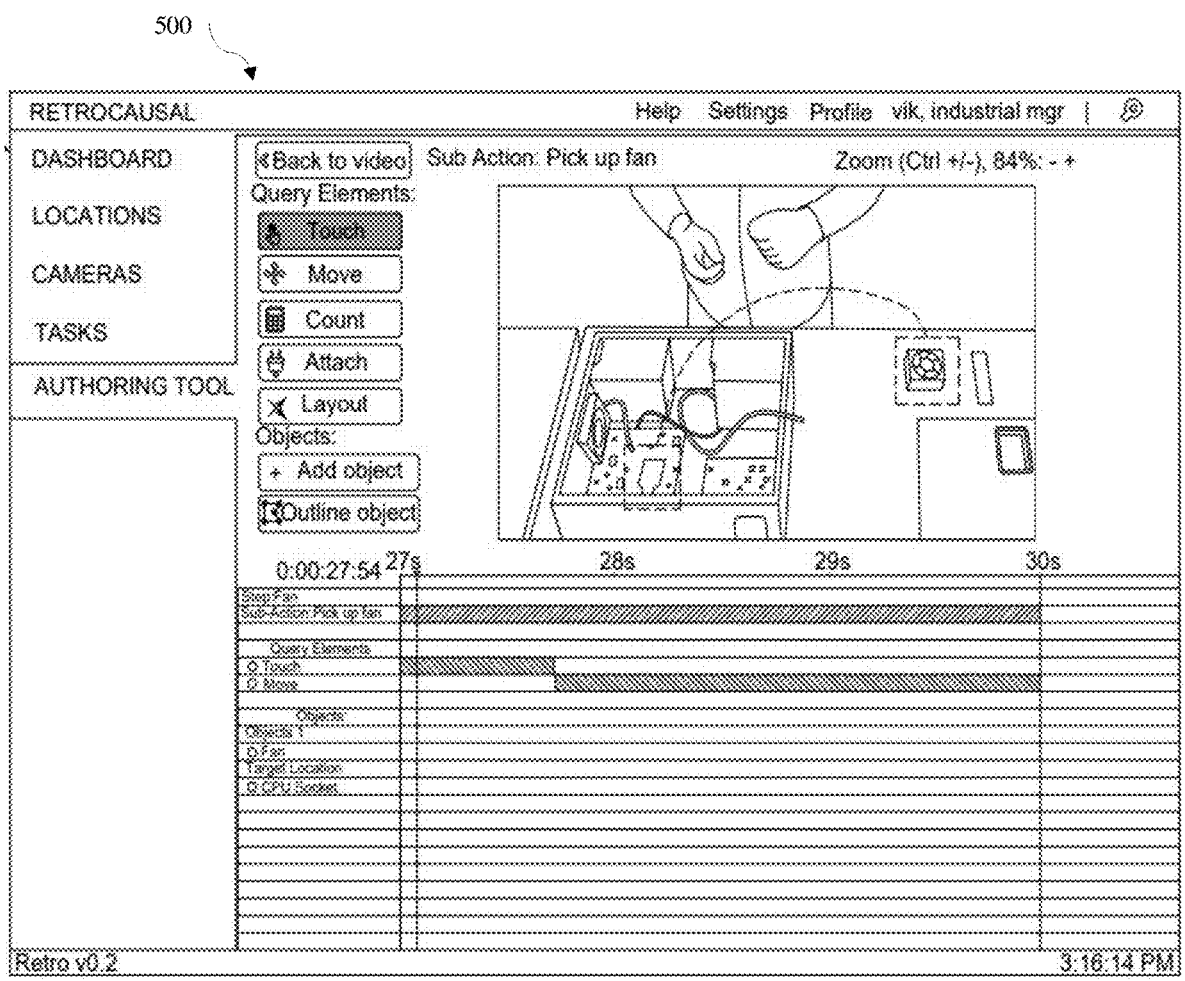
Figure 6:
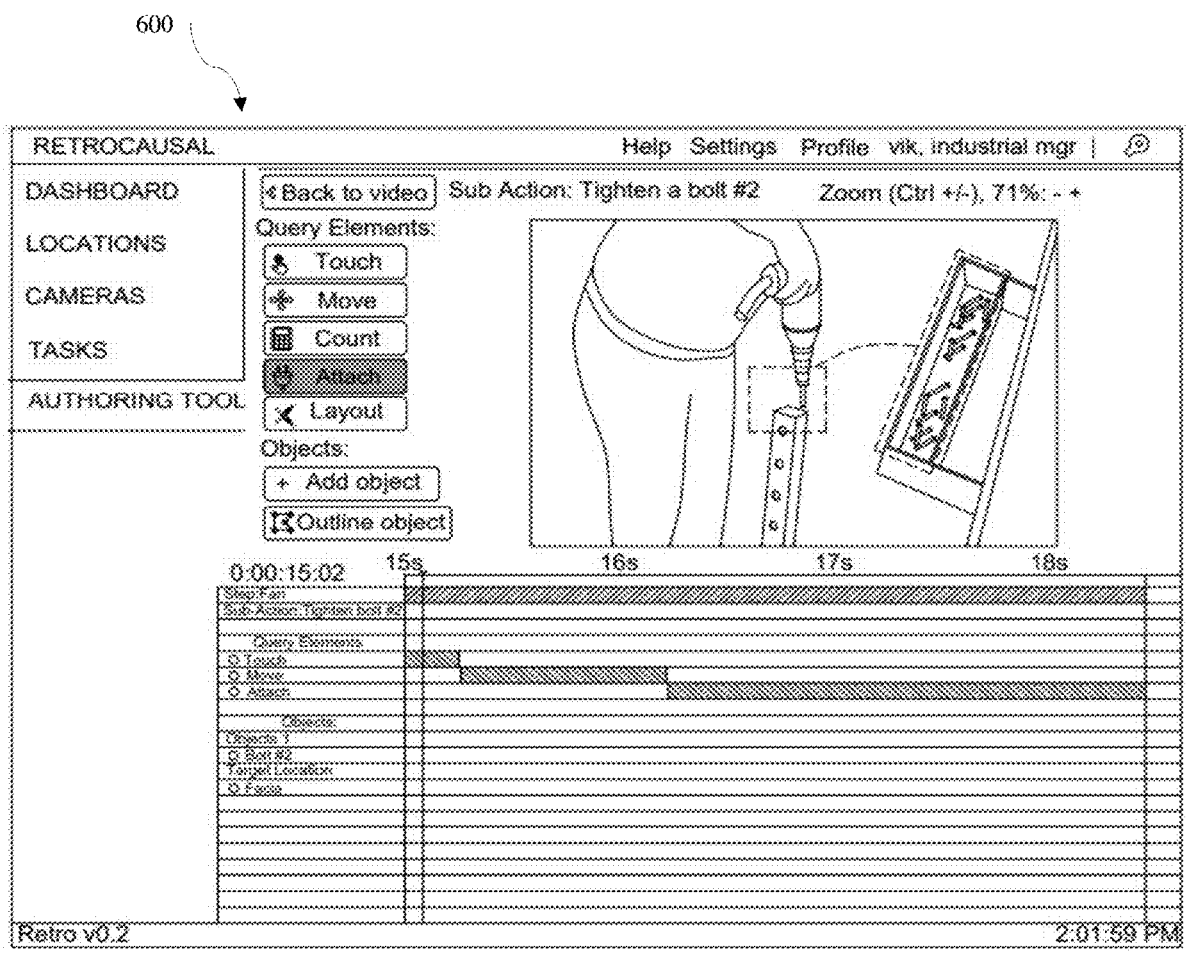

FIG. 4-FIG. 6 are exemplary graphical user interface representations capable of managing and evaluating one or more human activities, in accordance with an embodiment of the present disclosure. FIG. 4 represents a user interface 400 to label one or more standard operating procedures and one or more sub-actions. Further, the user selects a task and selects a corresponding video associated with the selected task. After selecting the task, one or more queries are labelled semantically. In order to set up the computing system 102 for evaluating one or more human activities, at least one training video is required to be labelled at the level of individual sub-actions. These sub-actions are contained in one or more video clips. Once, the required video clip examples for each sub-action are specified, an industrial engineer or IT staff member can set up quality checks within the individual sub-actions.

FIG. 5 represents a user interface 500, in which a user is allowed to choose one or more operations for each of the one or more actions performed by the human. In this case, the user may choose an operation "Touch" for sub-action "pick-up fan". The user interface 500 allows the user to select the object, which is fan, that has to be touched and placed within the central processing unit. The user interface 500 defines a source location of the fan and a target location of the fan. The system 102 specifies that the cooling fan must touch the processors to complete the sub-action 'pick up fan'.

FIG. 6 represents a user interface 600, in which the user is allowed to choose one or more operations for each of the one or more actions performed by the human. In this case, the user may choose an operation "Attach' for sub action "tighten a bolt #2". The user interface 600 allows the user to select the object, which is bolt, that has to be attached to a fascia bottom. The user interface 600 defines a source location of the bolt and a target location of the bolt. The system 102 specifies that the bolt from a bin on right must get attached to the fascia bottom in order to complete the sub-action "tighten a bolt #2".

Figure 7:
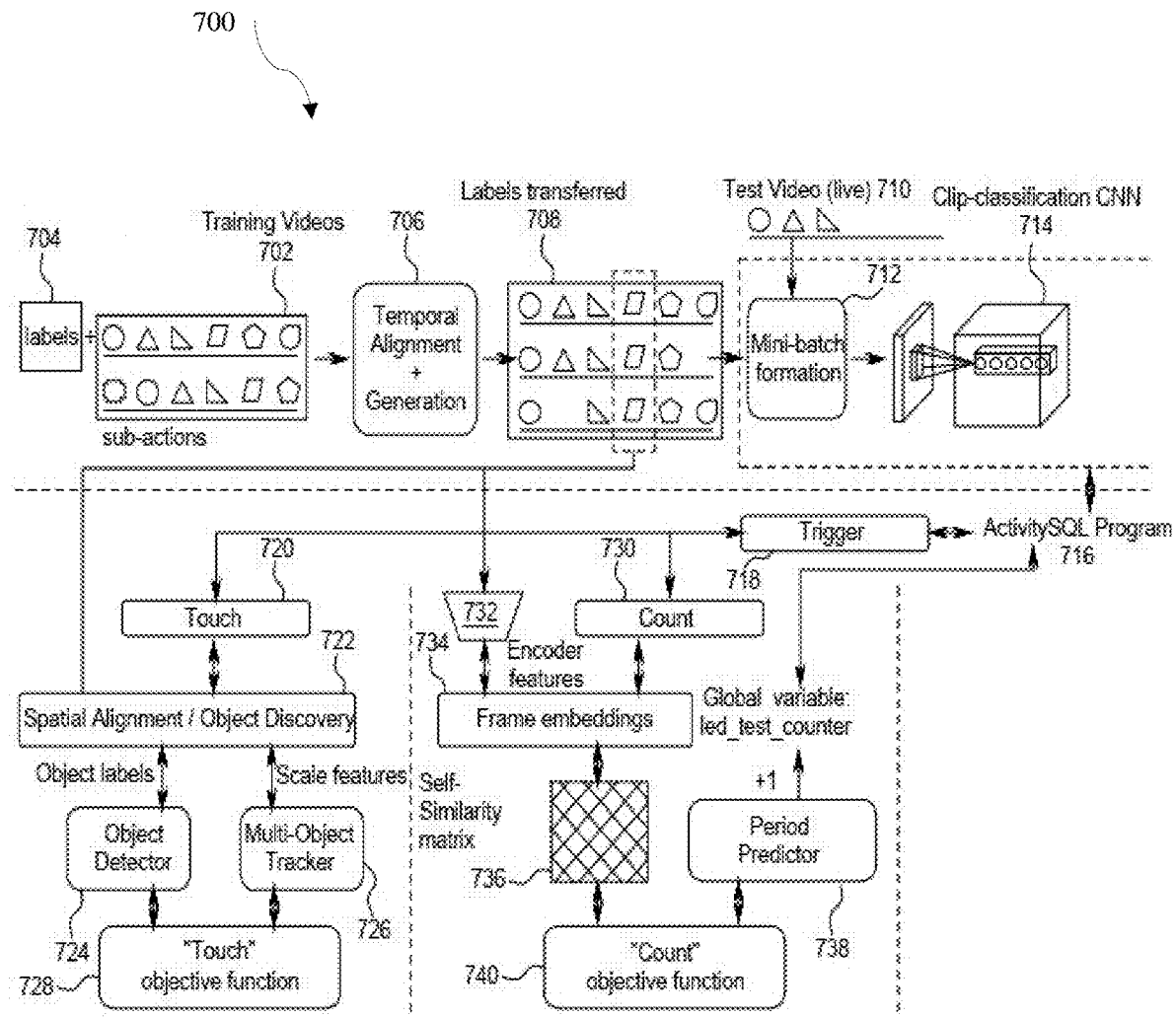
FIG. 7 is a block diagram illustrating an exemplary method of managing and evaluating one or more human activities, in accordance with an embodiment of the present disclosure.

FIG. 7 is a block diagram illustrating an exemplary method 700 of managing and evaluating one or more human activities, in accordance with an embodiment of the present disclosure. The training videos 702 are collected from the one or more external data sources 110. The training videos 702 comprises one or more human activities. Each of the at least one human activity comprises one or more actions performed by the human. Each action may be classified into sub-action and labelled 704. For example, a user records a handful of videos of a task being performed (training set), provides names for standard steps in the task, and labels the videos. The labelled videos are fed to a temporal alignment module 706. The temporal alignment module 706 which is a semantic video alignment module transfers 708 labels from the labelled videos to a super set of training set, by finding nearest neighbors for individual frames or sub-clips and incorporating frame-level ordering constraints. This super set of training set is fed to mini batch formation module 712 along with test video 710 to generate a significantly larger training set. At the mini batch formation module 712, the super set of training set is augmented in several ways. For example, deep fake video generation may be used to transfer person appearance (which have previously only been used in contexts where the fake video generated itself is to be consumed by humans generally for entertainment), perform background reconstruction to augment background appearance, add or delete sub-steps in a controlled manner in the provided videos and the like. This provides with sufficient variations to train a video clip classification model, such as a clip classification model 714 and generalize to unseen cases. This part of the system enables to estimate duration of individual steps in the activity. However, merely classifying a group of frames as belonging to a step in the activity as in conventional system, does not indicate whether the objective of the step was met or not. These conventional methods also does not scale to variations of the activity not seen in the training set, for example, alternative product configurations, or semi-repetitive maintenance scenarios as opposed to strictly repetitive assembly tasks. The output of the clip classification model 714 is fed to an activity SQL Program 716. The activity SQL Program 716 is a novel visual programming paradigm that generates neuro-symbolic code to confirm the correct performance of an activity in the video and potentially search for improvements to the original process itself. The activity SQL Program 716 combines computer vision capabilities including action classification, spatial-temporal video alignment, synthetic data augmentation, visual object discovery, detection, tracking, and fine-grained categorization, worker pose estimation and motion tracking, and semantically grounded 3D reconstruction for generating the neuro-symbolic code. The code corresponding to any of the query elements can be "executed" upon detection of any step/sub-actions of the activity, by applying a "trigger" 718 at that step. The query elements may be touch 720 or count 730 or attach or move or interact or layout or the like. The query elements are itself the operations. The detection of a certain step/sub-action of the activity that has been tagged by the programmer launches a sub-routine for one of the query element with the parameters specified. For instance, the Touch subroutine 720 whose parameters were graphically specified in 500, will discover 722 objects labelled 500 by the programmer on training video examples, detect those objects 724 in the live video feed, track 726 their motion across the image over time, until the final correct state for the objects specified in 500 is reached according to a mathematical "objective" function 728.

Another subroutine is Count 730, which in one of many possible realizations, collects a clip of live video stream in which the count of an action has to be performed, for instance the number of times a hammer hit a nail's head. This video clip gets passed through a convolutional network or another mathematical function 732 which computes a signature for each frame called frame embeddings 734. Each frame's embeddings are correlated with every other frame's embedding to compute a similarity matrix 736 which indicates the similarity of each frame of every other frame. This similarity matrix can either be fed to another neural network called Period Predictor 738 which analyses its structure to count the number of repetitions performed in the video clip. Alternatively the Period Prediction maybe a sub-routine that finds the modes in the similarity matrix to count a repetitive action in the video clip. The neural networks in 732 and 738 can be trained by a mathematical objective function that optimizes the predicted count against ground truth count on training video datasets.

An alternative to 730 is to utilize object discovery 722, object detection 724, and object tracking 726 to count a repetitive activity.

Figure 8:
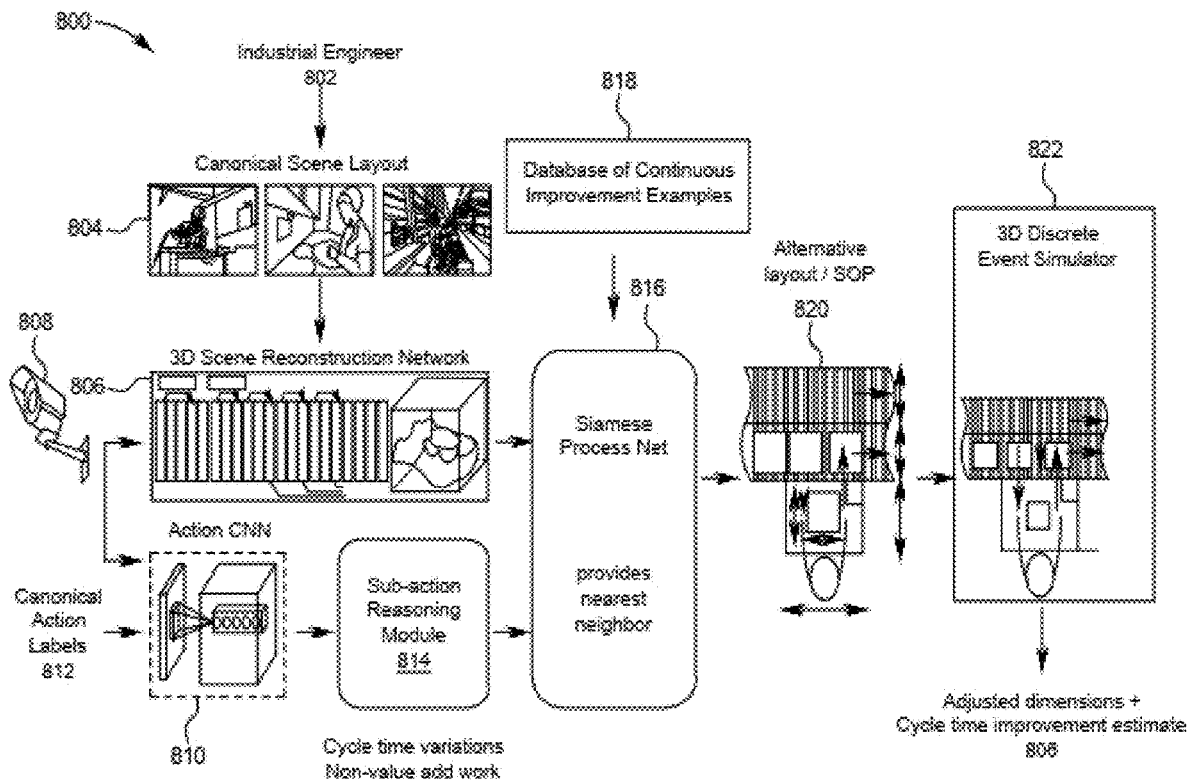
FIG. 8 is a block diagram illustrating an exemplary method of evaluating the one or more human activities, in accordance with an embodiment of the present disclosure.

FIG. 8 is a block diagram illustrating an exemplary method 800 of evaluating the one or more human activities, in accordance with an embodiment of the present disclosure. An industrial engineer 802 constructs a three-dimensional (3D) scene layout 804 comprising a human performing one or more human activities using one or more objects. This layout 804 is fed to a 3D scene reconstruction network 806. The 3D scene reconstruction network 806 reconstructs the 3D scene and semantically labels it. Further, the 3D scene reconstruction network 806 classifies sub-actions, using Action CNN 810 into hundreds of canonical categories frequently found in manual assembly tasks. Each of these classified canonical categories are labelled using canonical action labels 812. The classified and labelled 3D scene is fed to a "sub-action reasoning module" 814. The sub-action reasoning module 814 reasons about sub-action level inefficiencies, such as variations in time spent in a sub-action, or motions which are hazardous ergonomically. The output of the sub-action reasoning module 814 is fed to a Siamese process net 814 which compares the sub action level inefficiencies with pre-stored or historical inefficient processes. The historical inefficient processes are retrieved from database of continuous improvement 818 or an improvement database. The 3D scene layout with semantics together with canonical action signatures (feature vectors) allows us to compare against previously observed "inefficient processes". Similar "inefficient" processes are retrieved from the database of continuous improvement 818 by matching these signatures in the Siamese process net 814. The Siamese process net 814 then suggests alternate scene layouts or standard operating procedures 820 based on the comparison. These suggestions are process improvement ideas. These suggestions are then fed to a 3D Discrete Event Simulator 822 which is a physics engine such as Gazebo to finetune process parameters and estimate cycle time and ergonomics improvements. The 3D Discrete Event Simulator 822 is configured for simulating the generated one or more rectifiable solutions for the detected one or more anomalies in a simulation environment and updating the generated one or more rectifiable solutions with one or more alternative solutions based on results of simulation.

The database of continuous improvement 818 may be bootstrapped with configurations that users provide, as well as with textbook examples of workstation-level improvement. Once the capability is implemented at a large manufacturer, they can add their own "Kaizen events" automatically to the database of continuous improvement 818, and potentially share with a central database in a privacy-preserving way.

Figures 9A, 9B, 9C, 9D:
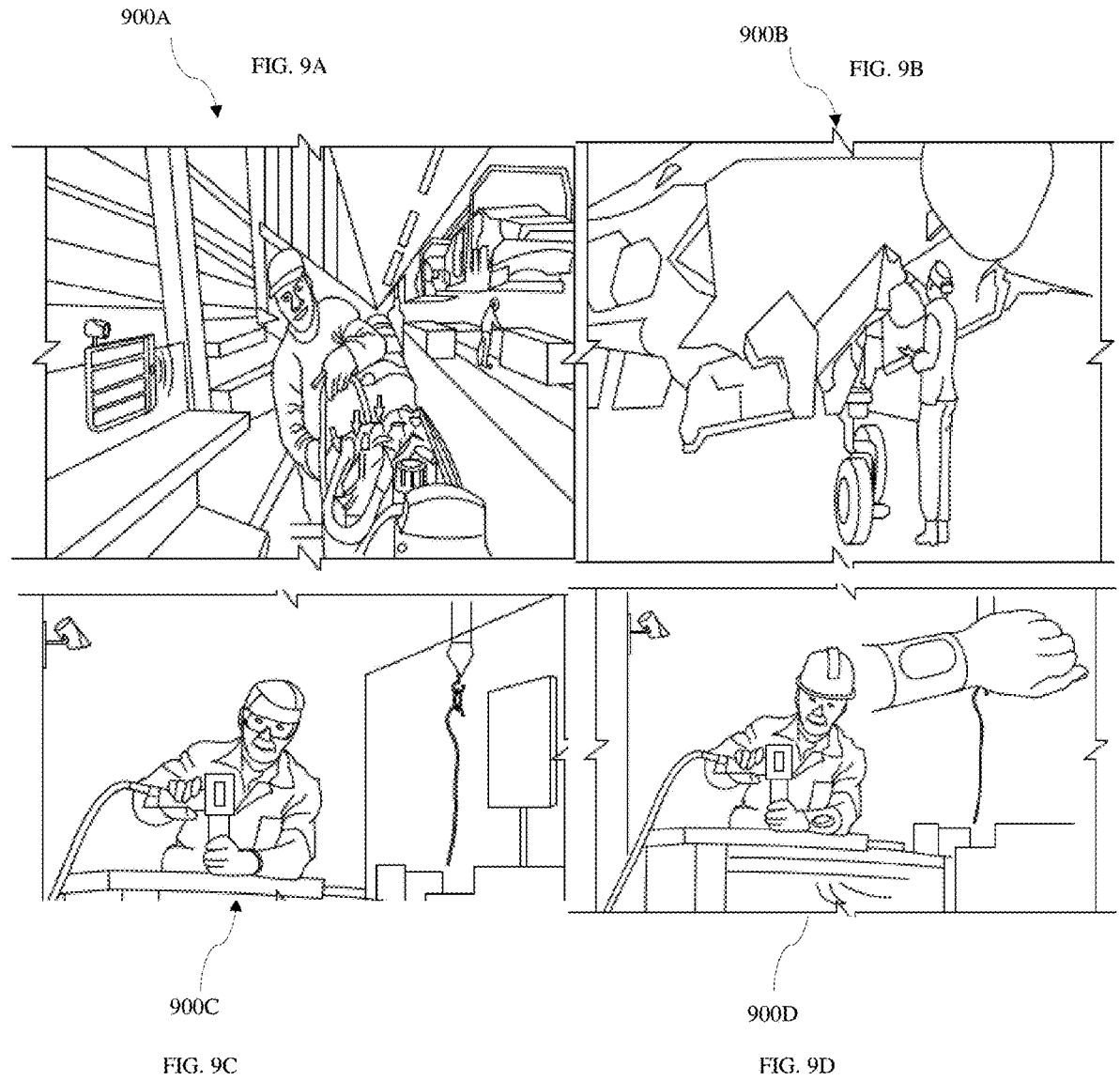
FIG. 9A-E are exemplary schematic representations of user environment comprising a human performing the one or more human activities, in accordance with an embodiment of the present disclosure.

FIG. 9A-E are exemplary schematic representations of user environment comprising a human performing the one or more human activities, in accordance with an embodiment of the present disclosure. In FIG. 9A, a typical setup of the system 102 is shown. One or more cameras installed within the user environment observe a worker performing an assembly job. The system 102 keeps monitoring the assembly job performed by the worker and evaluates the assembly job performed by the worker. In case, if the system 102 detects any anomalies in the assembly job performed by the worker, the system 102 generates alerts in the form of audio signals (as shown in FIG. 9A) to alert the worker on the anomalies and provide rectifiable solutions to the worker for better performing the assembly job.

In FIG. 9B, a worker repairing aircraft is shown. The worker has worn a head mount device capable of assisting the system 102 in evaluating the activity performed by the worker. This head mount device may use augmented reality application to generate alerts, generate visual query lists, generate visual instructions and provide rectifiable solutions. The system 102 keeps monitoring the repairing aircraft job performed by the worker and evaluates this job performed by the worker. In case, if the system 102 detects any anomalies in this job performed by the worker, the system 102 generates alerts in the form of visual signals (as shown in FIG. 9B) on the head mount device to alert the worker on the anomalies and provide rectifiable solutions to the worker for better performing the job. For example, the system 102 warns the worker about an incomplete or a missing step with multiple output modalities. The multiple output modalities may include an audio, a text, a visual augmentation and the like.

In FIG. 9C, a doctor wearing a wearable lens and performing an eye test is shown. This wearable device may use augmented reality application to generate alerts, generate visual query lists, generate visual instructions and provide rectifiable solutions. The system 102 keeps monitoring the eye test job performed by the doctor and evaluates this job performed by the doctor. In case, if the system 102 detects any anomalies in this job performed by the doctor, the system 102 generates alerts in the form of visual signals (as shown in FIG. 9B) on the wearable lens to alert the doctor on the anomalies and provide rectifiable solutions to the doctor for better performing the job.

Similarly, in FIG. 9D, a field engineer wearing a smart watch or a smart band and performing a task is shown. The smart watch or a smart band may generate alerts, generate visual query lists, generate visual instructions and provide rectifiable solutions. The system 102 keeps monitoring the job performed by the engineer and evaluates this job performed by the engineer. In case, if the system 102 detects any anomalies in this job performed by the engineer, the system 102 generates alerts in the form of visual signals (as shown in FIG. 9B) on the smart watch or a smart band to alert the engineer on the anomalies and provide rectifiable solutions to the engineer for better performing the job. In both FIG. 9C and FIG. 9D, cameras are installed in the user environment for capturing live videos of user performing the activity.

Figure 9E:
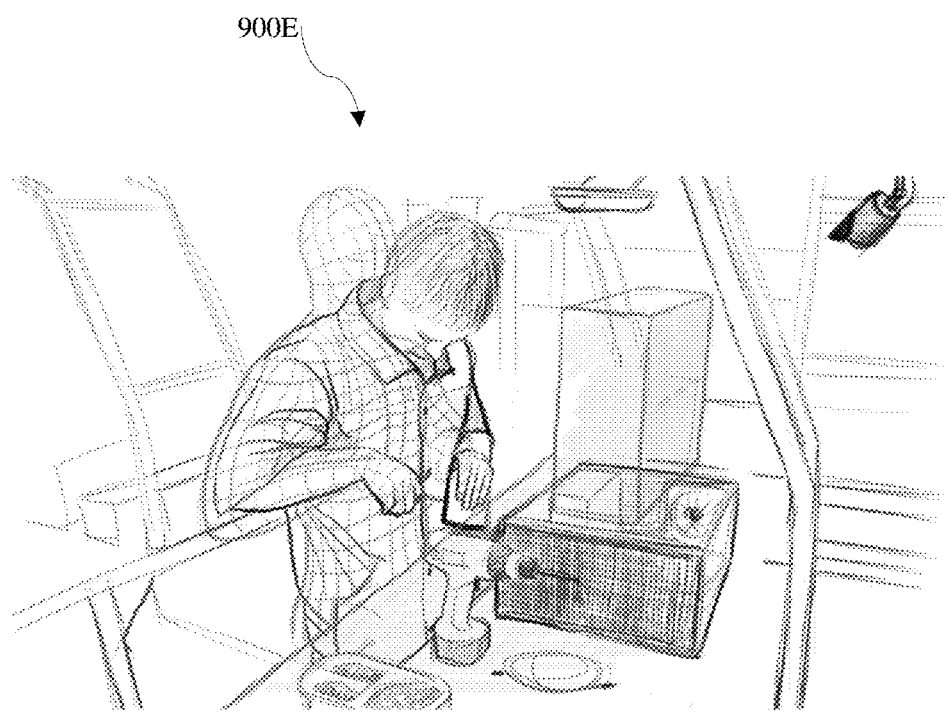

FIG. 9E depicts a worker performing a repairing activity. The user environment has cameras installed to monitor and capture live videos of the worker performing the repairing activity. FIG. 9E represents a 'process improvement' query element depicted on a user interface of the system 102 to an industrial engineer or IT staff who is evaluating the activity performed by the worker. The system 102 compares an observed manual activity and workspace layout against a database and suggest a new workspace layouts, better human posture, expected improvements in cycle time, assembly errors, ergonomics and the like.

Figure 10:
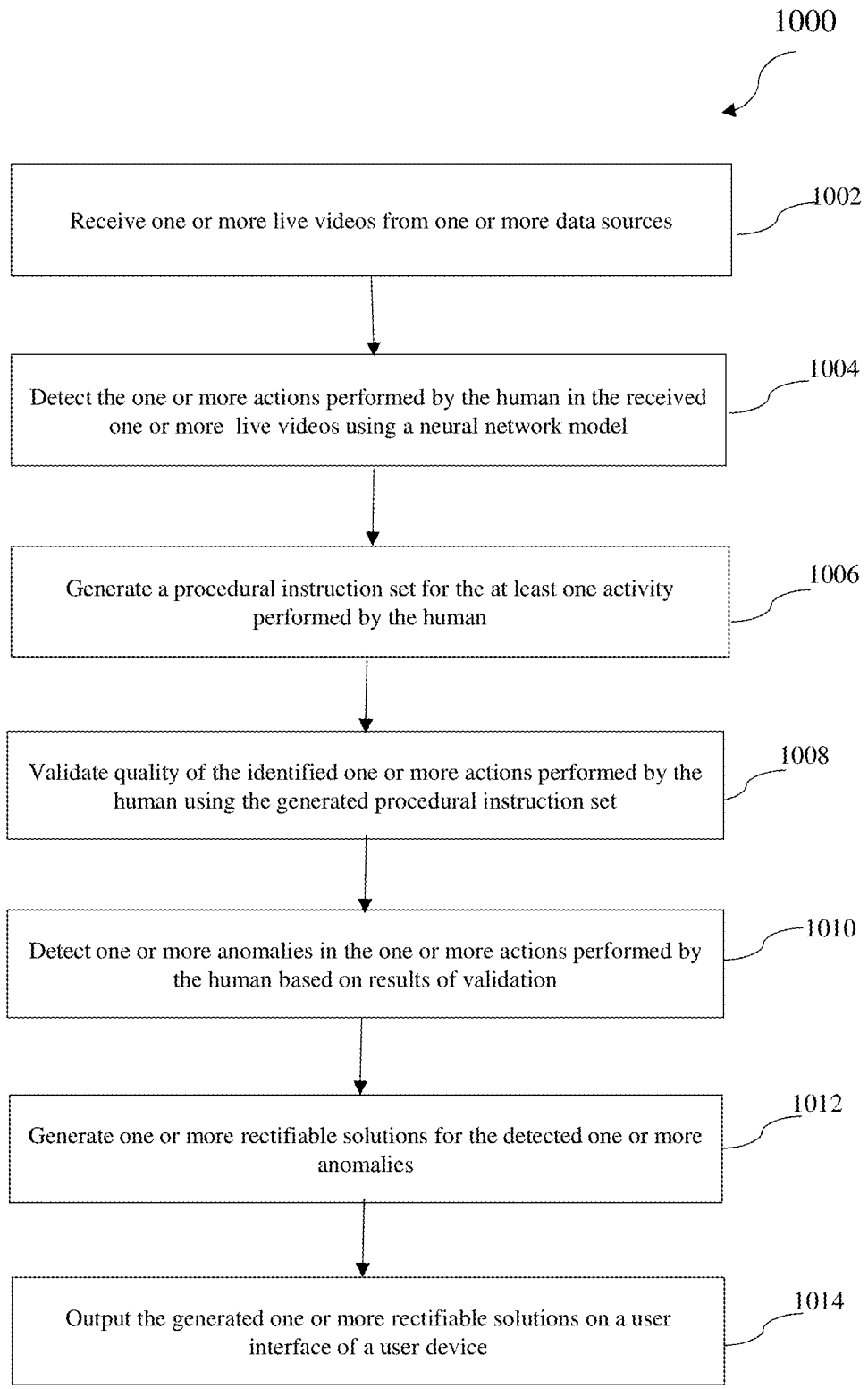
FIG. 10 is a process flow diagram illustrating an exemplary method for managing and evaluating one or more human activities, in accordance with an embodiment of the present disclosure.

FIG. 10 is a process flow diagram illustrating an exemplary method 1000 for managing and evaluating one or more human activities, in accordance with an embodiment of the present disclosure. At step 1002, one or more live videos are received from one or more data sources 110. The one or more live videos comprises at least one activity performed by a human. The at least one activity comprises one or more actions performed by the human. At step 1004, the one or more actions performed by the human are detected in the received one or more live videos using a neural network model. At step 1006, a procedural instruction set for the at least one activity performed by the human is generated upon detecting the one or more actions performed by the human. At step 1008, a quality of the identified one or more actions performed by the human is validated using the generated procedural instruction set. At step 1010, one or more anomalies in the one or more actions performed by the human are detected based on results of validation. At step 1012, one or more rectifiable solutions are generated for the detected one or more anomalies. At step 1014, the generated one or more rectifiable solutions are outputted on a user interface 108 of a user device 106.

The method 1000 further comprises simulating the generated one or more rectifiable solutions for the detected one or more anomalies in a simulation environment and updating the generated one or more rectifiable solutions with one or more alternative solutions based on results of simulation.

In detecting the one or more actions performed by the human in the received one or more live videos using the neural network model, the method 1000 includes classifying the one or more live videos into one or more subset video data based on type of activity performed by the human in the received one or more live videos. Further, the method 1000 includes identifying the one or more actions performed by the human in the one or more subset video data. Also, the method 1000 includes assigning labels to the one or more subset video data based on the identified one or more actions performed by the human. Also, the method 1000 includes transferring the assigned labels from the labelled one or more subset video data to super set of training videos by determining nearest neighbour for each of at least one individual video frames and the labelled one or more subset video data. Furthermore, the method 1000 includes performing frame-level ordering constraints to the super set of training videos. Also, the method 1000 includes generating an increased number of training videos from the super set of training videos by augmenting the super set of training videos. Moreover, the method 1000 includes training the neural network model with the generated increased number of training videos. Further, the method 1000 includes detecting the one or more actions performed by the human in the received one or more live videos using the trained neural network model. The neural network model is a convolution neural network model.

In generating the procedural instruction set for the at least one activity performed by the human upon detecting the one or more actions performed by the human, the method 1000 includes defining one or more operations for each of the detected one or more actions performed by the human. The method 1000 further includes defining one or more sub-actions to be performed by the human for each of the defined one or more operations. The one or more sub-actions which performs the defined one or more operations yields desired end result. The method 1000 further includes generating the procedural instruction set for the at least one activity performed by the human. The generated procedural instruction set comprises the one or more operations, the one or more sub-actions and one or more query lists associated with the one or more operations and the one or more sub-actions.

In validating the quality of the identified one or more actions performed by the human using the generated procedural instruction set, the method 1000 includes detecting starting action of the at least one activity to be performed by the human from the received one or more live videos. Further, the method 1000 includes detecting one or more objects interacting with the human in the received one or more live videos. Also, the method 1000 includes tracking interaction of the detected one or more objects with the human by determining object trajectory of the one or more objects in a spatial dimension with respect to the one or more actions performed by the human. Furthermore, the method 1000 includes classifying the tracked interaction of the detected one or more objects with the human into one or more operations and one or more sub-actions. Furthermore, the method 1000 includes performing a first level of validation by comparing the classified one or more operations and one or more sub-actions with the one or more operations and the one or more sub-actions comprised in the generated procedural instruction set. Moreover, the method 1000 includes performing a second level of validation by determining whether the classified one or more operations and the one or more sub-actions meet requirements of predefined quality checks. Also, the method 1000 includes validating the quality of the identified one or more actions performed by the human based on the results of first level of validation and the second level of validation.

In detecting the one or more anomalies in the one or more actions performed by the human based on results of validation, the method 1000 includes determining a deviation in the one or more actions performed by the human with respect to the one or more actions defined in the procedural instruction set based on results of a first level of validation. The method 1000 further includes determining whether classified one or more operations and the one or more sub-actions fail to meet requirements of the predefined quality checks based on results of a second level of validation. Further, the method 1000 includes detecting the one or more anomalies in the one or more actions performed by the human based on the deviation and the determination.

In generating one or more rectifiable solutions for the detected one or more anomalies, the method 1000 includes mapping the detected one or more anomalies with corresponding prestored anomalies stored in an action improvement database. The method 1000 further includes determining one or more rectifiable solutions corresponding to the mapped prestored anomalies. Further, the method 1000 includes retrieving the one or more rectifiable solutions for the detected one or more anomalies from the action improvement database. Furthermore, the method 1000 includes optimizing the retrieved one or more rectifiable solutions for the detected one or more anomalies based on a user requirement.

Further, the method 1000 includes generating the optimized one or more rectifiable solutions for the detected one or more anomalies.

The method 1000 further includes generating one or more query lists associated with each of the one or more operations and the one or more sub-actions performed by the human in the received one or more live videos. Further, the method 1000 includes outputting the generated one or more query list on the user interface 108 of the user device 106 using augmented, virtual or mixed reality while performing the at least one activity by the human in real time.

The method 1000 includes generating one or more alert messages upon detecting the one or more anomalies and reporting the generated one or more alert messages to the user device 106 using a communication network 104.

Various embodiments of the present system provide a technical solution to the problem of management and evaluation of one or more human activities. The current solution can learn complex activities over time merely from a handful of video examples, and a few hours of setting up the "Activity" program using a convenient visual interface. Further, the current system provides the three-dimension scene as well as motion parameters, to significantly reduce the three-dimensional modeling effort needed to perform such simulation, which helps in making the process simpler and reduces the overall time required for the process. Further, the present invention automatically proposes action items for "process improvement" upon observing the process, by matching against previous process improvement procedures from a database, which makes the system more reliable and provides efficient and relevant outcomes.

Further, the present system is capable of learning complex activities over time merely from a handful of video examples, and a few hours of setting up the "Activity" program using a convenient visual interface. Further, the present system allows robustly checking the completion of each individual sub-step of an activity as defined by the visual programmer Further, the present system automatically evaluates the correct performance of diverse human activities, such as an assembly job on a manufacturing floor, a maintenance task on a complex piece of equipment, a medical procedure performed at a hospital, and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for performing context-based application disablement on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A system for management and evaluation of one or more human activities, the system comprising:
   one or more hardware processors; and
   a memory coupled to the one or more hardware processors, wherein the memory comprises a plurality of subsystems in the form of programmable instructions executable by the one or more hardware processors, wherein the plurality of subsystem comprises:
      a receiver subsystem configured for receiving one or more live videos from one or more data sources, wherein the one or more live videos comprises at least one activity performed by a human, and wherein the at least one activity comprises one or more actions performed by the human;
      an action classifier subsystem configured for detecting the one or more actions performed by the human in the received one or more live videos using a neural network model;
      an activity instruction generator subsystem configured for generating a procedural instruction set for the at least one activity performed by the human upon detecting the one or more actions performed by the human;
      an action quality validation subsystem configured for validating quality of the identified one or more actions performed by the human using the generated procedural instruction set;
      an anomaly detection subsystem configured for detecting one or more anomalies in the one or more actions performed by the human based on results of validation;
      a rectifiable solution generator subsystem configured for generating one or more rectifiable solutions for the detected one or more anomalies; and
      an output subsystem configured for outputting the generated one or more rectifiable solutions on a user interface of a user device.

2. The system of claim 1, further comprising a simulator subsystem configured for:
   simulating the generated one or more rectifiable solutions for the detected one or more anomalies in a simulation environment; and
   updating the generated one or more rectifiable solutions with one or more alternative solutions based on results of simulation.

3. The system of claim 1, wherein in detecting the one or more actions performed by the human in the received one or more live videos using the neural network model, the action classifier subsystem is configured for:
   classifying the one or more live videos into one or more subset video data based on type of activity performed by the human in the received one or more live videos;
   identifying the one or more actions performed by the human in the one or more subset video data;
   assigning labels to the one or more subset video data based on the identified one or more actions performed by the human;
   transferring the assigned labels from the labelled one or more subset video data to super set of training videos by determining nearest neighbor for each of at least one individual video frames and the labelled one or more subset video data;
   performing frame-level ordering constraints to the super set of training videos;
   generating an increased number of training videos from the super set of training videos by augmenting the super set of training videos;
   training the neural network model with the generated increased number of training videos; and
   detecting the one or more actions performed by the human in the received one or more live videos using the trained neural network model.

4. The system of claim 1, wherein the neural network model is a convolution neural network model.

5. The system of claim 1, wherein in generating the procedural instruction set for the at least one activity performed by the human upon detecting the one or more actions performed by the human, the activity instruction generator subsystem is configured for:

defining one or more operations for each of the detected one or more actions performed by the human;

defining one or more sub-actions to be performed by the human for each of the defined one or more operations, wherein the one or more sub-actions which performs the defined one or more operations yields desired end result; and generating the procedural instruction set for the at least one activity performed by the human, wherein the generated procedural instruction set comprises the one or more operations, the one or more sub-actions and one or more query lists associated with the one or more operations and the one or more sub-actions.

6. The system of claim 1, wherein in validating the quality of the identified one or more actions performed by the human using the generated procedural instruction set, the action quality validation subsystem is configured for:

detecting starting action of the at least one activity to be performed by the human from the received one or more live videos;

detecting one or more objects interacting with the human in the received one or more live videos;

tracking interaction of the detected one or more objects with the human by determining object trajectory of the one or more objects in a spatial dimension with respect to the one or more actions performed by the human;

classifying the tracked interaction of the detected one or more objects with the human into one or more operations and one or more sub-actions;

performing a first level of validation by comparing the classified one or more operations and one or more sub-actions with the one or more operations and the one or more sub-actions comprised in the generated procedural instruction set;

performing a second level of validation by determining whether the classified one or more operations and the one or more sub-actions meet requirements of predefined quality checks; and validating the quality of the identified one or more actions performed by the human based on the results of first level of validation and the second level of validation.

7. The system of claim 1, wherein in detecting the one or more anomalies in the one or more actions performed by the human based on results of validation, the anomaly detection subsystem is configured for:

determining a deviation in the one or more actions performed by the human with respect to the one or more actions defined in the procedural instruction set based on results of a first level of validation;

determining whether classified one or more operations and the one or more sub-actions fail to meet requirements of the predefined quality checks based on results of a second level of validation; and detecting the one or more anomalies in the one or more actions performed by the human based on the deviation and the determination.

8. The system of claim 1, wherein in generating one or more rectifiable solutions for the detected one or more anomalies, the rectifiable solution generator subsystem is configured for:

mapping the detected one or more anomalies with corresponding prestored anomalies stored in an action improvement database;

determining one or more rectifiable solutions corresponding to the mapped prestored anomalies;

retrieving the one or more rectifiable solutions for the detected one or more anomalies from the action improvement database;

optimizing the retrieved one or more rectifiable solutions for the detected one or more anomalies based on a user requirement; and generating the optimized one or more rectifiable solutions for the detected one or more anomalies.

9. The system of claim 1, wherein the output subsystem is further configured for:

generating one or more query lists associated with each of the one or more operations and the one or more sub-actions performed by the human in the received one or more live videos; and outputting the generated one or more query list on the user interface of the user device using augmented, virtual or mixed reality while performing the at least one activity by the human in real time.

10. The system of claim 1, wherein the output subsystem is further configured for:

generating one or more alert messages upon detecting the one or more anomalies; and reporting the generated one or more alert messages to the user device using a communication network.

11. A method for management and evaluation of one or more human activities, the method comprising:

receiving, by a processor, one or more live videos from one or more data sources, wherein the one or more live videos comprises at least one activity performed by a human, and wherein the at least one activity comprises one or more actions performed by the human;

detecting, by the processor, the one or more actions performed by the human in the received one or more live videos using a neural network model;

generating, by the processor, a procedural instruction set for the at least one activity performed by the human upon detecting the one or more actions performed by the human;

validating, by the processor, quality of the identified one or more actions performed by the human using the generated procedural instruction set;

detecting, by the processor, one or more anomalies in the one or more actions performed by the human based on results of validation;

generating, by the processor, one or more rectifiable solutions for the detected one or more anomalies; and outputting, by the processor, the generated one or more rectifiable solutions on a user interface of a user device.

12. The method of claim 11, further comprising:

simulating the generated one or more rectifiable solutions for the detected one or more anomalies in a simulation environment; and updating the generated one or more rectifiable solutions with one or more alternative solutions based on results of simulation.

13. The method of claim 11, wherein detecting the one or more actions performed by the human in the received one or more live videos using the neural network model comprises:

classifying the one or more live videos into one or more subset video data based on type of activity performed by the human in the received one or more live videos;

identifying the one or more actions performed by the human in the one or more subset video data;

assigning labels to the one or more subset video data based on the identified one or more actions performed by the human;

transferring the assigned labels from the labelled one or more subset video data to super set of training videos by determining nearest neighbor for each of at least one individual video frames and the labelled one or more subset video data;

performing frame-level ordering constraints to the super set of training videos;

generating an increased number of training videos from the super set of training videos by augmenting the super set of training videos;

training the neural network model with the generated increased number of training videos; and detecting the one or more actions performed by the human in the received one or more live videos using the trained neural network model.

14. The method of claim 11, wherein the neural network model is a convolution neural network model.

15. The method of claim 11, wherein generating the procedural instruction set for the at least one activity performed by the human upon detecting the one or more actions performed by the human comprises:

defining one or more operations for each of the detected one or more actions performed by the human;

defining one or more sub-actions to be performed by the human for each of the defined one or more operations, wherein the one or more sub-actions which performs the defined one or more operations yields desired end result; and generating the procedural instruction set for the at least one activity performed by the human, wherein the generated procedural instruction set comprises the one or more operations, the one or more sub-actions and one or more query lists associated with the one or more operations and the one or more sub-actions.

16. The method of claim 11, wherein validating the quality of the identified one or more actions performed by the human using the generated procedural instruction set comprises:

detecting starting action of the at least one activity to be performed by the human from the received one or more live videos;

detecting one or more objects interacting with the human in the received one or more live videos;

tracking interaction of the detected one or more objects with the human by determining object trajectory of the one or more objects in a spatial dimension with respect to the one or more actions performed by the human;

classifying the tracked interaction of the detected one or more objects with the human into one or more operations and one or more sub-actions;

performing a first level of validation by comparing the classified one or more operations and one or more sub-actions with the one or more operations and the one or more sub-actions comprised in the generated procedural instruction set;

performing a second level of validation by determining whether the classified one or more operations and the one or more sub-actions meet requirements of predefined quality checks; and validating the quality of the identified one or more actions performed by the human based on the results of first level of validation and the second level of validation.

17. The method of claim 11, wherein detecting the one or more anomalies in the one or more actions performed by the human based on results of validation comprises:

determining a deviation in the one or more actions performed by the human with respect to the one or more actions defined in the procedural instruction set based on results of a first level of validation;

determining whether classified one or more operations and the one or more sub-actions fail to meet requirements of the predefined quality checks based on results of a second level of validation; and detecting the one or more anomalies in the one or more actions performed by the human based on the deviation and the determination.

18. The method of claim 11, wherein generating the one or more rectifiable solutions for the detected one or more anomalies comprises:

mapping the detected one or more anomalies with corresponding prestored anomalies stored in an action improvement database;

determining one or more rectifiable solutions corresponding to the mapped prestored anomalies;

retrieving the one or more rectifiable solutions for the detected one or more anomalies from the action improvement database;

optimizing the retrieved one or more rectifiable solutions for the detected one or more anomalies based on a user requirement; and generating the optimized one or more rectifiable solutions for the detected one or more anomalies.

19. The method of claim 11, further comprising:

generating one or more query lists associated with each of the one or more operations and the one or more sub-actions performed by the human in the received one or more live videos; and outputting the generated one or more query list on the user interface of the user device using augmented, virtual or mixed reality while performing the at least one activity by the human in real time.

20. The method of claim 11, further comprising:

generating one or more alert messages upon detecting the one or more anomalies; and reporting the generated one or more alert messages to the user device using a communication network.

* * * * *